(12) United States Patent
Chiang et al.

(10) Patent No.: US 8,674,962 B2
(45) Date of Patent: Mar. 18, 2014

(54) TOUCH COORDINATE CALCULATION METHOD FOR TOUCH PANEL

(75) Inventors: Chung-Lin Chiang, Hsinchu (TW); Chin-hua Kuo, Hsinchu (TW)

(73) Assignee: Silicon Integrated Systems Corp., Hsinchu (TW)

(*) Notice: Subject to any disclaimer, the term of this patent is extended or adjusted under 35 U.S.C. 154(b) by 174 days.

(21) Appl. No.: 13/306,986

(22) Filed: Nov. 30, 2011

(65) Prior Publication Data

US 2013/0135216 A1    May 30, 2013

(51) Int. Cl.
*G06F 3/041* (2006.01)

(52) U.S. Cl.
USPC .......................................... 345/174; 345/175

(58) Field of Classification Search
USPC ................ 345/161, 166, 173–175; 178/18.06
See application file for complete search history.

(56) References Cited

U.S. PATENT DOCUMENTS

| | | | |
|---|---|---|---|
| 2009/0096758 A1* | 4/2009 | Hotelling et al. | 345/173 |
| 2010/0252336 A1* | 10/2010 | Lu et al. | 178/18.06 |
| 2011/0087455 A1 | 4/2011 | Chang et al. | |

* cited by examiner

*Primary Examiner* — Andrew Sasinowski

(57) ABSTRACT

A method for calculating a touch coordinate on a touch panel is provided, the touch panel having a plurality of points, said method comprising: determining a group of candidate points when a touch occurs on the touch panel, each candidate point having one sensing value; assigning weights to the sensing values of the respective candidate points to obtain weighted sensing values; and calculating a coordinate by utilizing the weighted sensing values and positions of the respective candidate points. By using said method, the calculation result of the touch coordinate will be more stable.

11 Claims, 7 Drawing Sheets

TOUCH COORDINATE CALCULATION METHOD FOR TOUCH PANEL

TECHNICAL FIELD OF THE INVENTION

The present invention relates to a touch sensing technique, and more particularly, to a method for calculating a touch coordinate on a touch panel.

BACKGROUND OF THE INVENTION

Nowadays, most electronic devices such as cell phones, portable media players, and notebooks including netbooks and tablet computers, usually are equipped with touch panels serving as input interfaces of the new generation to replace the conventional mousse and keyboards.

The touch panel has a plurality of sensors for detecting a touch or touches. The touch panel has a matrix of points. One or more points of the touch panel are touched when an object touches the touch panel. The point that is touched is referred to as a "touch point" herein. The sensors are used to sense the sensing value or values (e.g., capacitance(s)) of the touch point or points when a touch occurs on the touch panel. The sensing values and corresponding positional information of the touch points are transmitted to a rear end circuit. Conventionally, the rear end circuit will determine a touch coordinate for the touch by calculating a centroid coordinate based on the sensing values and the positions of the touch points.

A conventional touch position detecting method in US Publication No. 2011/0087455 discloses a centroid calculation based on the differences between two neighboring signal values for determining the touch coordinate. Additionally, in US Publication No. 2010/0252336, a position method for a touch device is disclosed and said method utilizes another centroid calculation to determine the touch coordinate, wherein said centroid calculation is based on the square root of the sensing value.

The present invention provides a novel and inventive method for making the calculation result of the touch coordinate more stable.

SUMMARY OF THE INVENTION

An objective of the present invention is to provide a touch coordinate calculation method for a touch panel, which is capable of making the calculation result of the touch coordinate more stable.

In accordance with an aspect of the present invention, a method for calculating a touch coordinate on a touch panel is provided, the touch panel having a plurality of points, said method comprising: determining a group of candidate points when a touch occurs on the touch panel, each candidate point having one sensing value; assigning weights to the sensing values of the respective candidate points to obtain weighted sensing values; and calculating a coordinate by utilizing the weighted sensing values and positions of the respective candidate points.

In the present invention, the sensing values of the respective candidate points are weighted. In this manner, the calculation results of the touch coordinate in multiple calculations will be more converged to the same point. When an object touches the touch panel and presses down for a while, the calculated touch coordinate is less likely to drift all around.

BRIEF DESCRIPTION OF THE DRAWINGS

The present invention will be described in detail in conjunction with the appending drawings, in which.

DETAILED DESCRIPTION OF THE INVENTION

Figure 1:
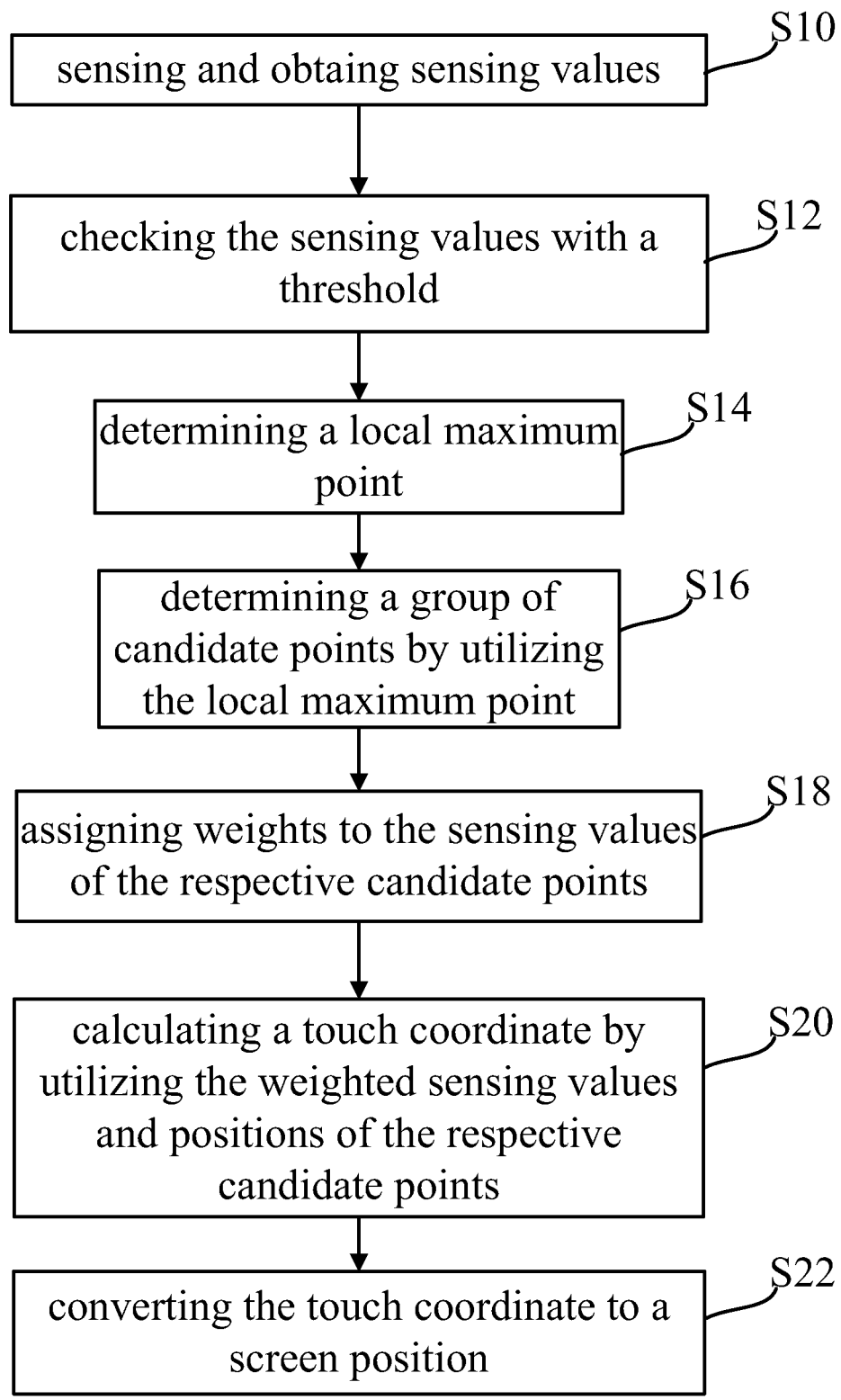
FIG. 1 is a flow chart showing a touch coordinate calculation method for a touch panel in accordance with the present invention.
Figure 2:
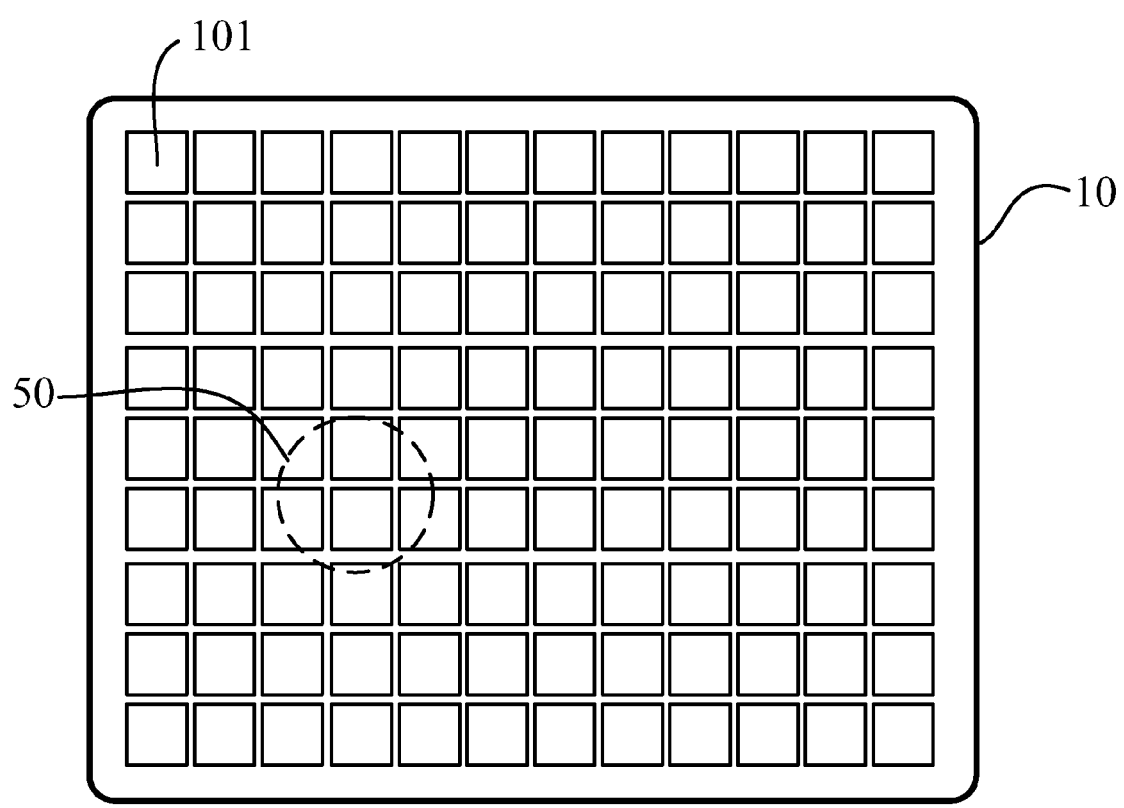
FIG. 2 is a diagram showing a touch occurred on a touch panel.

The present invention provides a method for calculating a touch coordinate on a touch panel of a touch sensitive device. The touch panel includes a number of points. One or more points are touched when a touch occurs on the touch panel. That is, there will be one or more touch points. The present invention is to determine a coordinate of the touch, which can be referred to as a "touch coordinate. FIG. 1 is a flow chart showing a touch coordinate calculation method for a touch panel in accordance with the present invention. FIGS. 2 to 7 are diagrams illustrating each step shown in FIG. 1. Referring to FIG. 1 in accompany with FIGS. 2 to 7, the touch coordinate calculation method of the present invention is described as below.

Ideally, one point on the touch panel has a zero sensing value when it is not touched, and has a non-zero sensing value when it is touched. When an object touches the touch panel, a region involving the touch points is referred to as a "touched region". In the beginning of the method, a group of candidate points are selected or determined when a touch occurs on the touch panel. The process of determining the group of candidate points is described with reference to Steps S10 to S16 of FIG. 1 and illustrated through FIGS. 2 to 4.

Figure 3:
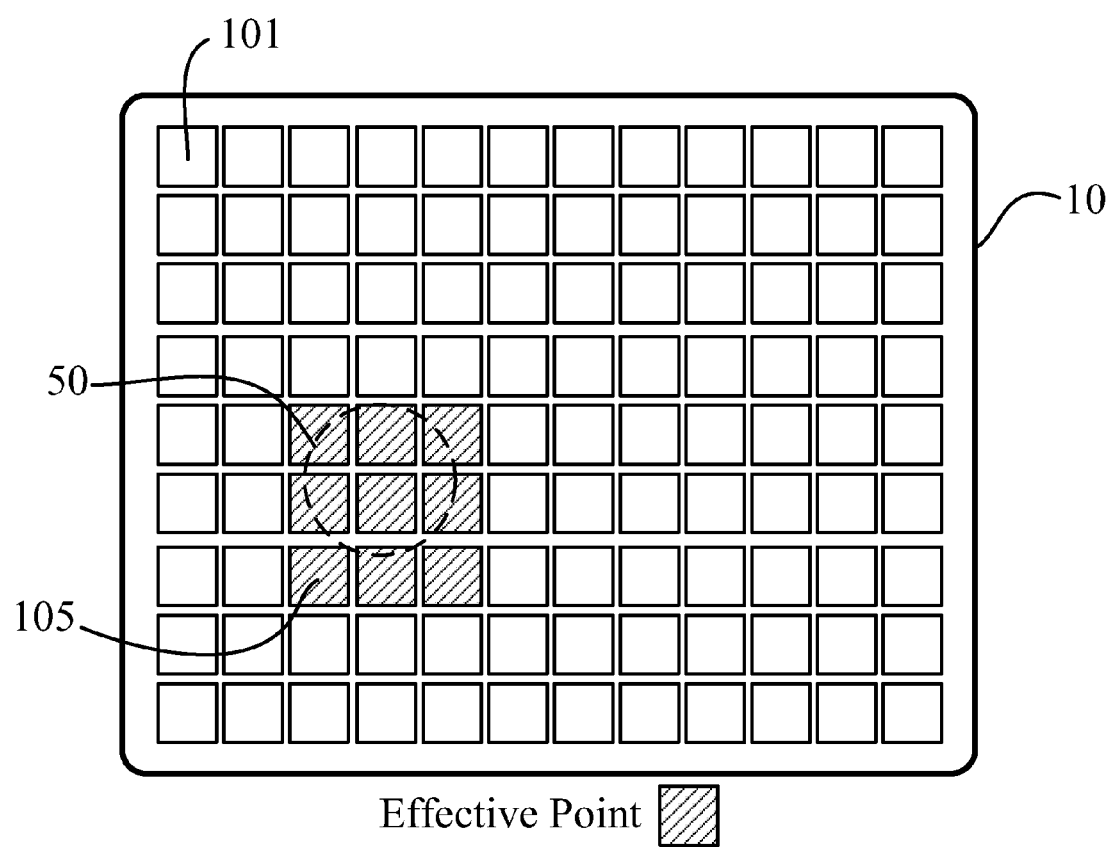
FIG. 3 is a diagram showing an effective point of which a sensing value is greater than a threshold.

As shown in FIG. 3, the touch panel 10 comprises a plurality of points 101. Each point 101 may correspond to a pixel or a plurality of pixels. Assumed an object (e.g. a finger or a stylus, not shown) touches the touch panel 10, the touched region is indicated by a circle 50. In Step S10 of the method, every point 101 of the touch panel 10 is sensed to obtain the sensing values of the respective points 101. The points related to the touched region 50 are touch points and have non-zero sensing values.

In Step S12, whether the sensing value of each point 101 is greater than a threshold is checked. The point having the sensing value greater than the threshold is referred to as an "effective point" 105 herein. Due to noises, some un-touched points have non-zero sensing values, but the sensing values are usually very low. These points can be eliminated in this step.

Figure 4:
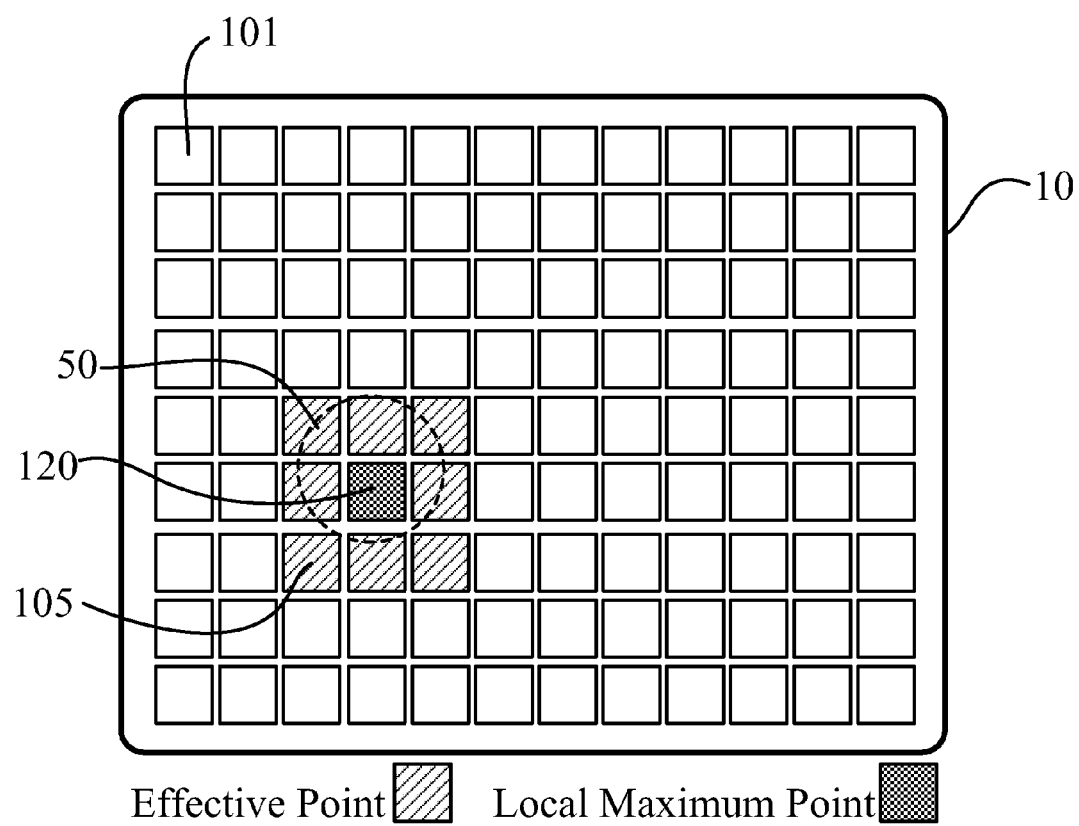
FIG. 4 is a diagram showing a local maximum point having a local maximum sensing value.

In Step S14, a local maximum is determined from the sensing values that are greater than the threshold. That is, the effective points 105 determined in Step S12 are examined. Among the effective points 105, the point having the local maximum sensing value is referred to as a "local maximum point" 120 herein, as shown in FIG. 4. It is noted that only one local maximum point 120 is described as an example in the present embodiment. However, it is possible to determine a plurality of local maximum points 120 among all the effective points of the touch panel 10 when a plurality of touches occur on the touch panel.

In Step S16, the local maximum point 120 is used as a center point to determine a calculating region. A predetermined size of the calculating region, e.g., a region of 3×3 points (or any other size such as 5×5 points) is determined. The calculating region has the local maximum point 120 at the center as the center point and further includes peripheral points with respect to the center. The points included in this calculating region can be referred to as "candidate points". The group of candidate points are used to calculate the touch coordinate of the touched region 50.

Figure 5:
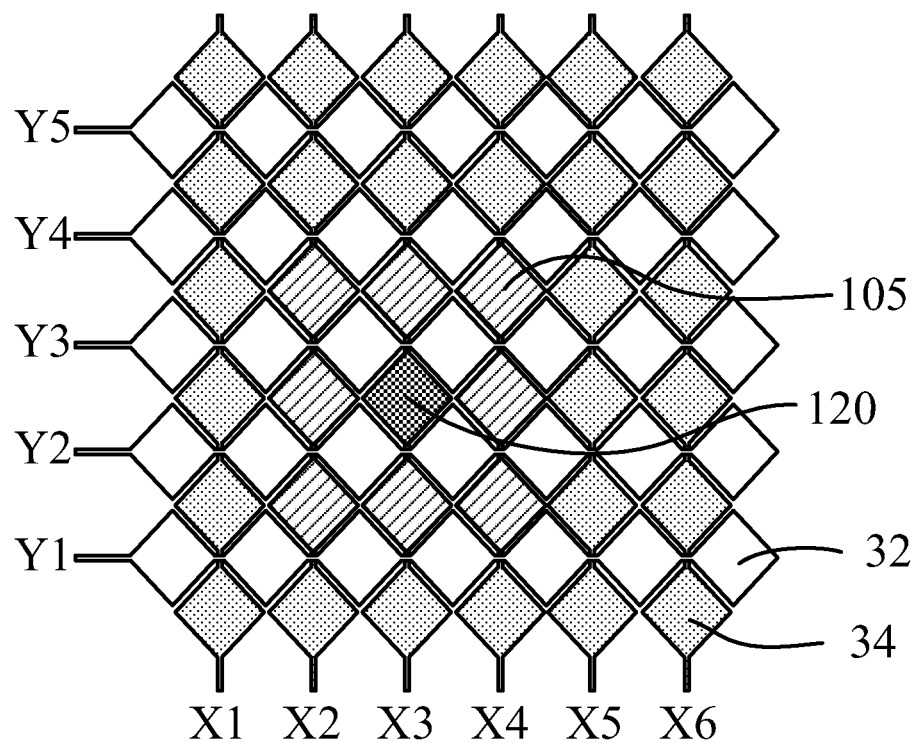
FIG. 5 is a diagram showing a sensitive panel of a touch panel.

As known, the touch panel 10 comprises a sensitive panel 20 and a screen (not shown). FIG. 5 is a diagram showing a sensitive panel of a mutual capacitance touch panel. The sensitive panel 20 comprises a plurality of sensing elements such as driving electrodes 32 and sensing electrodes 34. In the shown example, each sensing electrode 34 corresponds to a point 101 mentioned above. The effective point 105 and the local maximum point 120 are correspondingly shown on the sensitive panel 20 for the sake of descriptive convenience. The driving electrodes 32 and sensing electrodes 34 are rhombus electrodes disposed in the same plane. The driving electrodes 32 are arranged in a Y direction (e.g., Y1 to Y6) and the sensing electrodes 34 are arranged in an X direction (e.g., X1 to X6), as shown in FIG. 5. The driving electrodes 32 are sequentially scanned. A sensing value is read from a sensing electrode 34 when the corresponding driving electrode 32 is scanned. For the mutual capacitance touch panel, the sensing value is read from the sensing electrode 34 rather than the driving electrode 32. Not every electrode 32 and 34 corresponds to a point 101 of the touch panel 10. The driving electrodes 32 do not produce the sensing value directly.

Figure 6A:
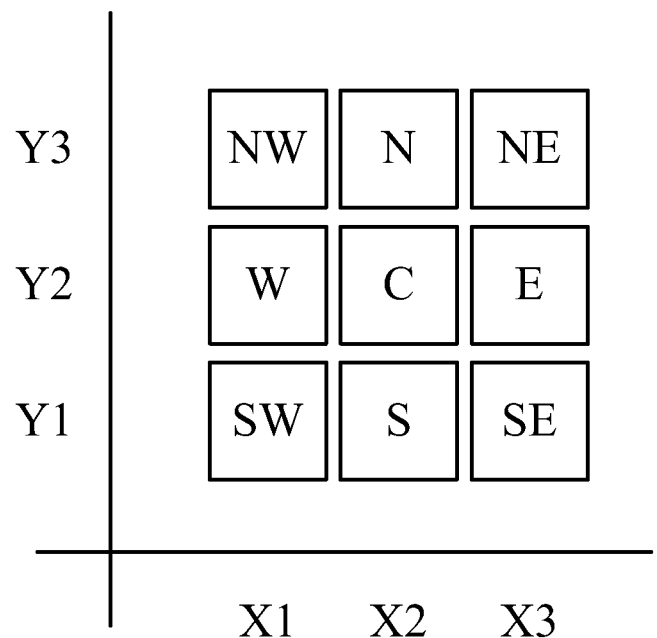
FIG. 6A is a diagram showing a 3×3 region of points on a touch panel.
Figure 6B:
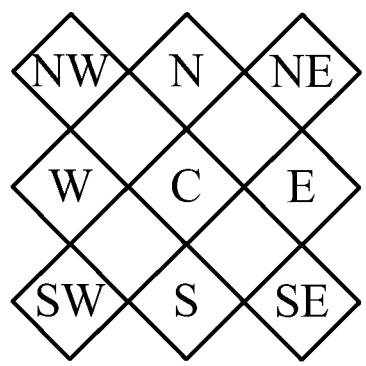
FIG. 6B is a diagram showing a 3×3 region of sensing electrodes on a sensitive panel.

FIG. 6A is a diagram showing a region of 3×3 points on the touch panel 10. FIG. 6B is a diagram showing a region of 3×3 sensing electrodes 34 on the sensitive panel 20, and each sensing electrode 34 corresponds to a point. As shown in FIG. 6A or 6B, which illustrates a calculating region of 3×3 points, points in the horizontal or vertical direction (i.e. an east point (E), a west point (W), a north point (N), and a south point (S)) are closer to a center point (C), and points in the diagonal direction (i.e. a north-east point (NE), a north-west point (NW), a south-east point (SE), and a south-west point (SW)) are more distanced away from the center point (C). In the present invention, the sensing values of the candidate points are assigned with different weights. In the group of the candidate points, the sensing values of the respective candidate points near the local maximum point 120 such as the E, W, N, and S points are given with a larger weight; while the sensing values of the other candidate points (e.g., the NE, NW, SE, and SW points) are given with a smaller weight. In this manner, the calculation results of the touch coordinate in multiple calculations will be more converged to the same point. When an object touches the touch panel 10 and presses down for a while, the calculated touch coordinate is less likely to drift all around. The details regarding this technique are described below.

Figure 6C:
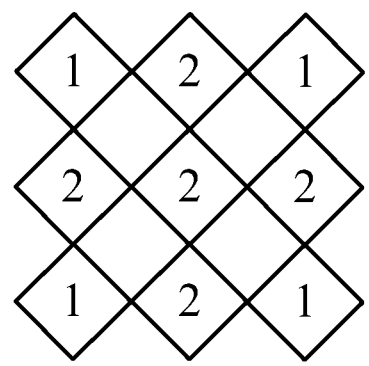
FIG. 6C is a diagram showing a weighting arrangement according to one embodiment of the present invention.

In Step S18, weights are assigned to the sensing values of the respective member of the group of candidate points determined in Step S16 to obtain weighted sensing values. The weights given to the sensing values are determined according to the relative distances of the respective candidate points with respect to the center point (i.e., the local maximum point 120) of the group of the candidate points. For example, the sensing value of each of the candidate points located in a diagonal direction (i.e, the NE, NW, SE, or SW point) is given by a first weight and the sensing value of each of the candidate points located in a horizontal direction (i.e., the E or W point) or a vertical direction (i.e., the N or S point) is given by a second weight. It is noted that the second weight is greater than the first weight. In one embodiment, the ratio of the second weight to the first weight is an integer number. For example, the second weight is 2 and the first weight is 1 as shown in FIG. 6C. In another embodiment, the ratio of the second weight to the first weight is a square root of 2. The ratio of the second weight to the first weight can be any proper value such as an integer number, a decimal fraction, and an irrational number. However, the use of the integer number has an advantage of consuming less calculation load.

In Step S20, the weighted sensing values obtained from Step S18 and the positions of the respective candidate points are utilized to calculate the touch coordinate based on a centroid algorithm. For the 3×3 calculating region as depicted in FIG. 6C, when the ratio of the second weight to the first weight is set as 2, the touch coordinate (X', Y') can be calculated by the following equation:

$$X' = \frac{(V_{NW} + 2*V_W + V_{SW})*X1 + (2*V_N + 2*V_C + 2*V_S)*X2 + (V_{NE} + 2*V_E + V_{SE})*X3}{(V_{NW} + 2*V_W + V_{SW} + 2*V_N + 2*V_C + 2*V_S + V_{NE} + 2*V_E + V_{SE})} \quad (1)$$

$$Y' = \frac{(V_{NW} + 2*V_N + V_{NE})*Y1 + (2*V_W + 2*V_C + 2*V_E)*Y2 + (V_{SW} + 2*V_S + V_{SE})*Y3}{(V_{NW} + 2*V_N + V_{NE} + 2*V_W + 2*V_C + 2*V_E + V_{SW} + 2*V_S + V_{SE})}$$

where V represents sensing values in corresponding positions, X1, X2, X3 are x coordinates of the respective candidate points, and Y1, Y2, Y3 are y coordinates of the respective candidate points.

Figure 7:
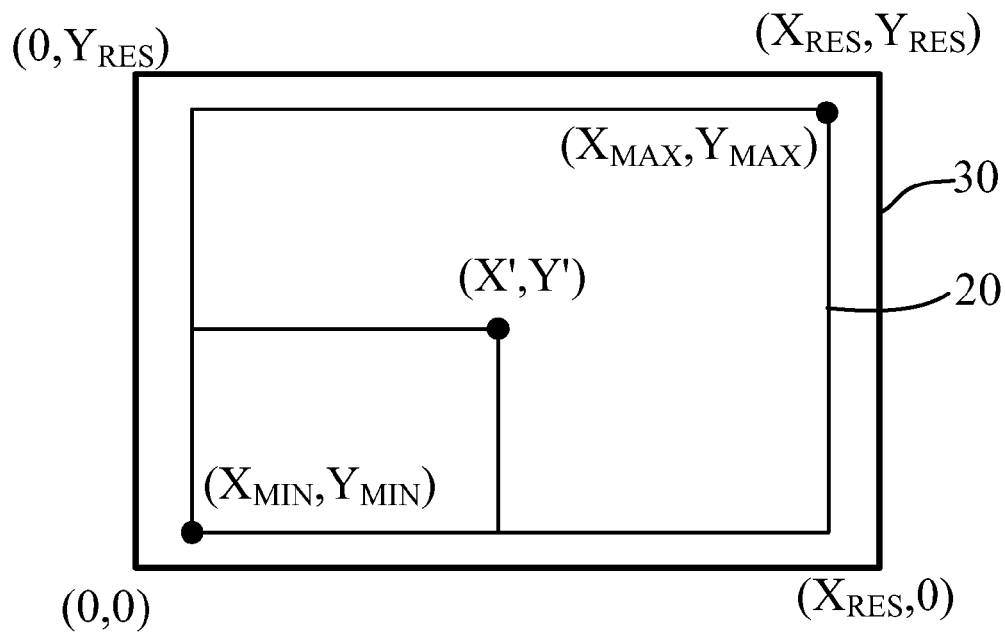
FIG. 7 is a diagram showing a touch coordinate converted between a sensitive panel and a screen.

As mentioned, the touch panel 10 further comprises a screen 30 (shown in FIG. 7). In the above embodiment, the sensitive panel 20 and the screen 30 have the same size. Therefore, the calculated touch coordinate (X', Y') is directly mapped to a corresponding position on the screen 30. However, referring to FIG. 7, the size of the sensitive panel 20 of the touch panel 10 may be different from that of the screen 30. In this situation, the calculated touch coordinate (X', Y') in Step 20 may have to be converted to a screen position based on a size and resolution of the screen 30 (Step S22). This operation can be achieved by the following equation:

$$X_C = \frac{(X' - X_{MIN})*X_{RES}}{X_{MAX} - X_{MIN}} \quad (2)$$

$$Y_C = \frac{(Y' - Y_{MIN})*Y_{RES}}{Y_{MAX} - Y_{MIN}}$$

where ($X_C$, $Y_C$) is a calibrated position on the screen 30, $X_{MAX}$ and $X_{MIN}$ are respectively the maximum and minimum x coordinates of the sensitive panel 20 in the coordinate system, $Y_{MAX}$ and $Y_{MIN}$ are respectively the maximum and minimum y coordinates of the sensitive panel 20 in the coordinate system, and $X_{RES}$ and $Y_{RES}$ are the resolution of the screen 30 respectively in an x-axis and a y-axis.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for calculating a touch coordinate on a touch panel, the touch panel having a plurality of points, said method comprising:
    determining a group of candidate points when a touch occurs on the touch panel, each candidate point having one sensing value;
    assigning weights to the sensing values of the respective candidate points to obtain weighted sensing values, wherein the weights given to the sensing values are determined according to relative distances of the respective candidate points with respect to a center position of said group of the candidate points, the sensing value of each of the candidate points located in a diagonal direction is given by a first weight, and the sensing value of each of the candidate points located in a horizontal direction or a vertical direction is given by a second weight; and
    calculating a coordinate by utilizing the weighted sensing values and positions of the respective candidate points.

2. The method of claim 1, wherein the second weight is greater than the first weight.

3. The method of claim 2, wherein a ratio of the second weight to the first weight is an integer number.

4. The method of claim 2, wherein a ratio of the second weight to the first weight is a square root of 2.

5. The method of claim 1, wherein each point corresponds to a pixel.

6. The method of claim 1, wherein each point corresponds to a plurality of pixels.

7. The method of claim 1, wherein the step of determining said group of candidate points comprises sub-steps of:
    sensing every point of the touch panel and obtaining the sensing value when the touch occurs on the touch panel;
    checking whether the sensing value of each point is greater than a threshold;
    determining a local maximum from the sensing values that are greater than the threshold and locating a local maximum point having the local maximum; and
    determining the group of the candidate points by using the local maximum point.

8. The method of claim 7, wherein the group of candidate points comprise the local maximum point and peripheral points with respect to the local maximum point.

9. The method of claim 1, further comprising a step of:
    converting the touch coordinate to a screen position based on a size and resolution of a screen to which the touch panel is applied.

10. The method of claim 1, wherein the sensing value comprises a capacitance.

11. The method of claim 1, wherein the touch panel comprises a mutual capacitance touch panel.

* * * * *